(12) United States Patent
Rolfe

(10) Patent No.: US 10,892,653 B1
(45) Date of Patent: Jan. 12, 2021

(54) SYSTEM AND METHOD FOR SIMULTANEOUS INDUCTIVE RECHARGING OF MULTIPLE ELECTRONIC DEVICES

(71) Applicant: Eric Rolfe, Kansas City, MO (US)

(72) Inventor: Eric Rolfe, Kansas City, MO (US)

(*) Notice: Subject to any disclaimer, the term of this patent is extended or adjusted under 35 U.S.C. 154(b) by 0 days.

(21) Appl. No.: 16/942,139

(22) Filed: Jul. 29, 2020

(51) Int. Cl.
*H02J 50/90* (2016.01)
*H02J 50/10* (2016.01)
*H02J 50/40* (2016.01)
*H02J 7/00* (2006.01)
*H02J 50/00* (2016.01)

(52) U.S. Cl.
CPC ............ *H02J 50/90* (2016.02); *H02J 7/0045* (2013.01); *H02J 50/005* (2020.01); *H02J 50/10* (2016.02); *H02J 50/40* (2016.02)

(58) Field of Classification Search
CPC .......... H02J 50/90; H02J 50/005; H02J 50/10; H02J 50/40; H02J 7/0045
USPC ........................................................ 307/104
See application file for complete search history.

(56) References Cited

U.S. PATENT DOCUMENTS

| | | | |
|---|---|---|---|
| 8,907,619 B2 | 12/2014 | Shukuya et al. | |
| 9,312,711 B2 | 4/2016 | Toya et al. | |
| 10,447,064 B2 | 10/2019 | Chi et al. | |
| 2010/0219183 A1* | 9/2010 | Azancot ............... | H02J 7/0047 219/676 |
| 2011/0074344 A1 | 3/2011 | Park et al. | |
| 2013/0162202 A1 | 6/2013 | Wang | |
| 2014/0176068 A1 | 6/2014 | Nishikawa | |

\* cited by examiner

*Primary Examiner* — Rexford N Barnie
*Assistant Examiner* — Thai H Tran
(74) *Attorney, Agent, or Firm* — Dale J. Ream

(57) ABSTRACT

A system and method for simultaneous recharging of multiple electronic devices a large area surface includes a placement surface the electronic devices and an interior area beneath the placement surface. Multiple mobile recharging assemblies are disposed in the interior area, each one including having wheels and sensors. A charging device is situated atop each mobile recharging assembly. An obstacle sensor detects obstacles and a controller is operable to signal the motion assembly to avoid obstacles. A charge sensor detects a battery on the placement surface in need of a charge. When a battery in need of a charge is detected, the charging device (coil) is energized to recharge the located battery. Once the charge sensor is indicative of having located a respective electronic device in need of a charge, a control system energizes a next mobile charging assembly to move and find a battery in need of a charge.

20 Claims, 8 Drawing Sheets

US 10,892,653 B1

SYSTEM AND METHOD FOR SIMULTANEOUS INDUCTIVE RECHARGING OF MULTIPLE ELECTRONIC DEVICES

BACKGROUND OF THE INVENTION

This invention relates generally to wireless charging systems and, more particularly, to a system and method for wireless and simultaneous recharging of a plurality of electronic computing devices placed upon a large area surface.

The number and type of electronic devices within even a single household can be overwhelming. For instance, parents and children, together, may each operate a mobile phone, a tablet, a laptop computer, and other wireless electronic devices that operate on batteries that must be recharged on a regular basis. While batteries are becoming more advanced and can last longer, the electronic devices also continue to get more advanced and require more and more battery power.

The conventional manner of recharging the battery of an electronic device is to plug the device in to a charge adapter and then into an AC electric outlet. More recently, the battery of an electronic device may be recharged inductively. Inductive charging refers to wireless or cordless charging of a power source. More particularly, electromagnetic induction provides electricity to electronic batteries using electric coils. A user merely lays his cell phone on a specially designed mat so that corresponding coils interact to supply recharging power.

Various devices have been proposed that utilize a moving platform beneath a surface and that moves over a predetermined area to locate a battery in need of a charge and then signals a charging device to move to the located position whereby to charge the located battery. Although presumably effective for their intended purposes, existing products and proposals are singular and require each electronic device to have its own recharging mat or to work in sequential or "first-come-first-served" fashion.

Therefore it would be desirable to have a system and method for wireless and simultaneous recharging of a plurality of electronic computing devices placed upon a large area surface.

SUMMARY OF THE INVENTION

A system and method for wireless and simultaneous recharging of a plurality of electronic computing devices placed upon a large area surface according to the present invention includes a placement assembly having a placement surface upon which the plurality of electronic devices are placed and defining an interior area beneath the placement surface. The system includes a plurality of mobile recharging assemblies disposed in the interior area, a respective mobile recharging assembly including a housing having a motion assembly operable to move the housing in the interior area when energized. A charging device (i.e. a charging coil) is situated atop each respective mobile recharging assembly. An obstacle sensor is disposed on the housing and operable to generate obstacle data upon detection of an obstacle. The respective mobile recharging assembly includes a controller in data communication with the obstacle sensor and with the motion assembly, the controller being operable to send an alternative motion signal to the motion assembly according to the obstacle data.

Further, a charge sensor is disposed on the respective mobile recharging assembly in data communication with the controller, the charge sensor being operable to generate charge data upon detecting a battery on the placement surface in need of a charge. A control system is positioned proximate the interior area in data communication with the controllers of the plurality of mobile devices, respectively, the control system being operable to energize the charging apparatus of the respective mobile recharging assembly to charge the battery detected as in need of a charge. The control system is operable to energize a next mobile charging assembly of the plurality of charging assemblies if the charge sensor includes charge data indicative of having located a respective electronic computing device in need of a charge.

Therefore, a general object of this invention is to provide a system and method for wireless and simultaneous recharging of a plurality of electronic computing devices placed upon a large area surface.

Another object of this invention is to provide a recharging system, as aforesaid, that utilizes inductive coupling to recharge a battery of an electronic device placed anywhere on the charging surface.

Still another object of this invention is to provide a recharging system, as aforesaid, having a plurality of recharging robots that sequentially move around a hollow interior area beneath the recharging surface, such as an area beneath a tabletop or countertop so as to detect and battery in need of a charge and, when found, stops and engages inductive recharging of the located battery.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an exploded view of the system as in FIG. 1a;

FIG. 4b is a underneath perspective view of the respective recharging assembly shown in FIG. 4a;

DESCRIPTION OF THE PREFERRED EMBODIMENT

Figure 1A:
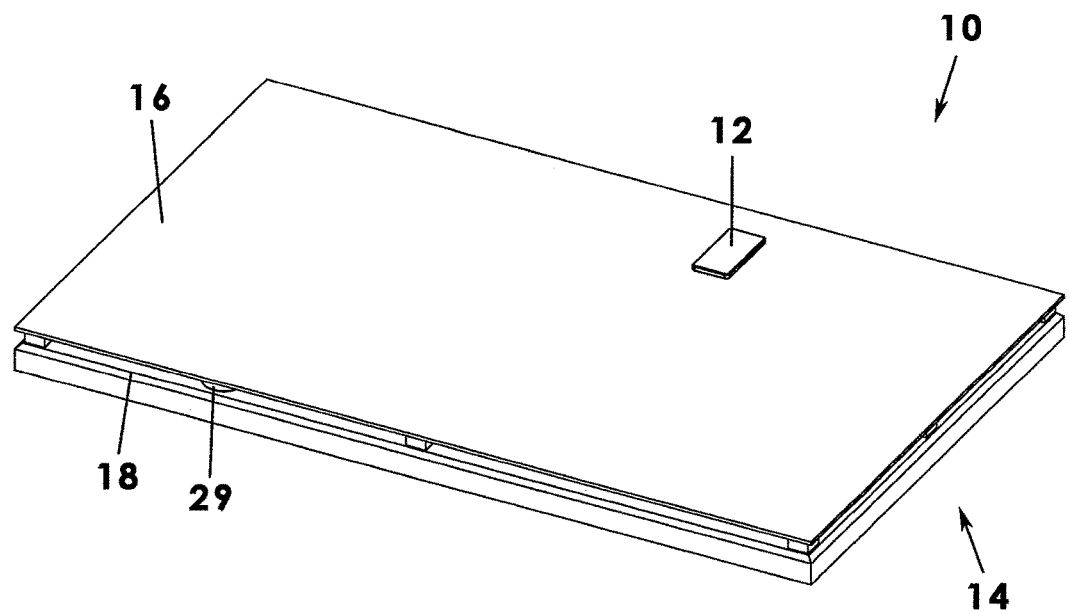
FIG. 1a is a perspective view of a system for wireless and simultaneous recharging of a plurality of electronic computing devices placed upon a large area surface according to a preferred embodiment of the present invention.

A system and method for simultaneous wireless recharging of a plurality of electronic computing devices placed upon a large area surface according to a preferred embodiment of the present invention will now be described with reference to FIG. 1a to 8 of the accompanying drawings. The system 10 includes a plurality of mobile recharging assemblies 20, each including a charging device having an obstacle sensor 25 and charging device 27. The system 10 also includes a master control system 40.

The system and method for simultaneous wireless recharging of a plurality of electronic computing devices first requires a placement assembly 14 that is configured, in one aspect, for receiving a plurality of electronic devices 12 each having a battery in need of recharging and, in another aspect, for allowing the plurality of recharging assemblies 20 to sequentially move in search of a battery in need of a charge. In the present application, each electronic device and its internal battery may be referred to interchangeably and by the same reference numeral 12. More particularly, the placement assembly 14 may include a placement surface 16 configured to receive and support at least one but preferably a plurality of electronic devices each powered by a battery that needs to be repeatedly recharged. Even, more specifically, the present system 10 is designed to supply electrical recharging to batteries configured to be wirelessly and inductively recharged. Inductive charging refers to wireless or cordless charging of a power source. Then, electromagnetic induction provides electricity to electronic batteries using electric coils. Complementary coils need only be proximate one another to induce electromagnetic recharging, i.e. no physical power cable is required. The placement surface 16 may be a tabletop, a countertop, or the like. Importantly, there are no specific positions or markings indicative specific positions on which an electronic device must be positioned to be recharged. In fact, multiple electronic devices 12 may be randomly positioned atop the placement surface 16 and be wirelessly and simultaneously recharged as will be described in further detail later.

Further, the placement assembly 14 may have a motion surface 18 that is downwardly displaced and generally parallel to the placement surface 16. The space between the motion surface 18 and the placement surface 16 defines an interior area. To be clear, the placement assembly 14 defines the interior area immediately beneath the placement surface 16 and is the space in which the plurality of recharging assemblies 20 move and search for a battery in need of a charge and then carries out a recharging event as described below.

Now more particularly, the plurality of recharging assemblies 20 is positioned on the motion surface 18 and, for clarity, may be viewed as robot$_1$, robot$_2$, robot$_3$, and so on to robot$_n$. In other words, the system 10 includes an army of sentinels whose task is to sequentially search for batteries associated with electronic devices 12 deposited onto the placement surface 16. Each recharging assembly 21 (also referred to as a "respective recharging assembly") includes a housing having a motion assembly 22 operable to move, when energized, the respective housing about the interior area in a search for a battery in need of charging. A respective recharging assembly 21 may be programmed to initially move forward until an obstacle is encountered. The motion assembly 22 may include a motor 23 and a pair of wheels 24 operably coupled to the motor 23, such as via a drive train 24a that controls each wheel separately so as to be capable of 360 degree rotation when the motor 23 is energized as would be known to one of ordinary skill in the art. Other drive trains that allow forward, backward, and lateral movement are also possible.

Further, each recharging assembly 21 may include an obstacle sensor 25 or a plurality of obstacle sensors, each configured to detect that the respective recharging assembly 21 has encountered (i.e. bumped into) or will soon encounter an obstacle. The obstacle sensor 25, therefore, may include a motion sensor or a pressure sensor. In an embodiment, the housing of the motion assembly 22 may include a bumper 26 (e.g. like an automobile bumper) having a pressure sensor configured to detect a deflection or impact indicative of having encountered an obstacle. For instance, a respective recharging assembly 21 is capable of detecting, via the obstacle sensor(s), if a wall or another respective recharging assembly 21 has been impacted (or soon will be impacted). Data indicative of an obstacle is referred to herein as obstacle data.

In an embodiment, a respective obstacle sensor 25 may be programmed regarding what action to take when an obstacle is encountered. To this end, the respective obstacle sensor 25 may include circuitry or be in data communication with a controller that automatically actuates the pair of wheels 24 to shift positions and to actuate the motor 23 to go forward or to reverse. Different actions may be taken depending on the obstacle encountered or which obstacle sensor 25 detected an obstacle. This process of escape actions may be repeated so that the respective recharging assembly 21 may avoid or be redirected around obstacles as it traverses the interior area in search of a battery in need of a charge. Actually identifying a battery in need of a recharging event will be described later.

In an embodiment, the navigation of a respective recharging assembly 21 and the plurality of recharging assemblies 20 may be monitored and managed by a master controller or referred to merely as a control system 40. In this embodiment, each recharging assembly 21 does not need to have an independent controller, memory, or programming. The control system 40 is in data communication with each one of the plurality of recharging assemblies 20. Thus, the control system 40 is aware of the position of every other recharging assembly 21, every obstacle, and every battery being recharged, and other data. It is understood that communications between the control system 40 and respective recharging assemblies 20 may utilize traditional transmitter and receiver technology, Bluetooth, or other similar wireless signal technology. In other words, each recharging assembly 21 may include a transmitter 32 and a receiver 34. Similarly, the control system 40 may also include a transmitter 46 and receiver 47 for communicating with respective recharging assemblies. It is understood that any transmitter and receiver combination may be substituted for a singular transceiver component. For the sake of efficiency, references in the drawings will be to transmitting and receiving signals using traditional transmitter-receiver components although it will be understood that equivalent wireless communications listed above may also be used.

Accordingly, if a respective recharging assembly 21 detects or encounters an obstacle (e.g. using its obstacle sensor 25), this obstacle data is communicated to the control system 40 which may then revert with a signal actuating a respective motion assembly 22 to go around the obstacle, reverse course, or even to take random action to continue its search for a battery in need of a charge. These actions are also referred to as escape actions and are included in the process 100 flowchart block labeled "activate drive train" and as described above. It is understood that the control system 40 may include a processor 41 in data communication with a non-volatile memory 42 configured to hold data 43 and programming instructions 44, the programming instructions including instructions regarding evasive action instructions, signals to actuate and energize a next recharging assembly 21 to move forward and search for another battery in need of a charge, and instructions actuating a charging device associated with a respective recharging assembly 21 to begin an inductive recharging event. The programming instructions, when executed by the processor 41, cause the processor 41 to actuate respective actions. Preferably, the control system 40 is situated close in proximity to the interior area so as to be proximate the plurality of recharging assemblies 20 although it would also work if displaced therefrom.

In another aspect, each recharging assembly 21 may include a charging device 27 in data communication with the controller 28 associated therewith disposed on its respective housing and that is operable to detect the presence of a battery, e.g. such as a battery of an electronics device 12 deposited on the placement surface. The charging device 27 collects or generates charge data as the motion assembly 22 moves a respective housing about the interior area of the placement assembly 14. It will be understood that, in the drawings and for clarity, reference numeral 27 refers generally to a charging device 27 that detects a battery in need of recharging and, more specifically, reference numeral 30 refers to the charging device 27 implemented via a coil 30. In an embodiment, the charging device 27 includes a coil 30 and is configured to electrically detect that it is in close proximity to a battery, such as a battery associated with an electronic device 12 that has been laid on the placement surface 16. In an embodiment, both the charging device 27 and the plurality of electronic devices 12 will include circuitry and programming according to Qi standards or protocol so that the coil 30 is able to detect a load of electricity emitted by a battery associated with a respective electronic device 12. In other words, the coil 30 is the detector if a battery in need of recharging has been located. More particularly, a respective battery in need of a charge (and placed on the placement surface 16) modulates the load on its own coil and the receiver—coil 30—can see the change in load and decode that to see what sort of power is needed or if a battery is even in close proximity at all. If a battery in need of a charge is detected in this manner, the charging device 27 (aka the coil 30) charge data is produced that is indicative of detection of a battery in need of a charge and transmitted to the control system; the control system 40 may then actuate a next recharging assembly 21 to move and search for another battery on the placement surface 16, as will be described later.

The Qi standard for recharging may also be recognized as implementation of an inductive coupled Radio Frequency Identification (RFID) system that uses mutual magnetic coupling to transfer power and data. At distances of about 10 cm or less, transponders (such as at a respective electronic device 12) use load modulation to transmit data back to a reader (such as to the coil 30). Further, the two devices are essentially magnetically coupled together (thus the need to be in close proximity) so as to share data, such as relative to a need to be charged.

Then, when a battery of an electronic device 12 is detected as needing a charge, electricity may be passed from coil 30 to a coil associated with the respective electronic device 12. The coil 30, when configured according to the Qi standard, is configured to both detect the battery in need of a charge and to recharge said battery.

In another embodiment, the charging device 27 may be an infrared sensing device capable of detecting proximity to a battery. More particularly, the charging device 27 may emit an infrared signal and wait a predetermined time to receive a reflection signal in which case, it may be assumed that a battery of an electronics device 12 has been located. In this instance, the charging device 27 or the on-board controller 28 associated with the charging device 27 may notify the control system 40 regarding the located battery in need of a charge. Operation of the control system will be described later.

In another embodiment, the charging device 27 may detect signal strength data in order to locate a battery of a respective electronic device 12. In one aspect, even a low signal strength may be detected whereas continued movement may result in higher signal strength. Preferably, signal strength data may be repeatedly transmitted to the control system 40 and evaluated and forward and backward actuation of a respective motion assembly 22 may be triggered thereby until signal strength of a now-located battery is maximized. Then, the control system 40 is operable to energize a charging event, i.e. energize the induction coil 30 as described later.

In an embodiment, the charging device 27 may include electronics associated with near field communication (NFC) to detect the presence of a battery in need of a charge. NFC involves a set of communication protocols for communication between two electronic devices over a distance of 4 cm (1½ in) or less. In other words, two devices equipped with an NFC chip may be placed within a few centimeters of each other to exchange data. In the present case, the charging device 27 may attempt to exchange signals with a properly equipped electronic device and, if signals are returned, thereby determine that a battery in need of a charge has been deposited on the placement surface 16. The control system 40 may be contacted as described above.

Now with still further description of a recharging event, the processor 41 of the control system 40, upon receiving respective charge data, may actuate the respective recharging assembly 21 to stop further movement (i.e. stop the respective motion assembly and searching routine) and begin an inductive recharging event. The actual act of inductive recharging follows below. More particularly, each respective recharging assembly 21 may include an induction coil 30 configured and operable for induction coupling and, thus, supplying electrical energy to the located battery. The induction coil 30 may also be referred to in the art as the primary or transmission coil. Then, the battery to be charged may include a receiving coil, also referred to as a secondary coil. Regarding inductive charging, it is understood that any moving electric charge creates a magnetic field, according to Oersted's law. Here, the magnetic field fluctuates in strength as the AC current is continually changing amplitude. A changing magnetic field generates an electromotive force known as Faraday's law of induction. Accordingly, alternating electric current is generated in a second induction coil of the located battery associated with an associated electronic device. Thus, the battery is given operating power.

With further reference to the control system 40, the control system 40 may include a processor 41 in data communication with a non-volatile memory 42 that is configured to store data 43 and to include programming instructions 44 (also referred to programming steps or just programming). It is understood that the processor 41 may be electrically connected to the control system power source 48 and configured to distribute current to other electronic components to which it is attached. Further, the processor 41 may be in data communication with the obstacle sensor 25 and other components of the motion assembly 22 such as the motor 23 and pair of wheels 24. Accordingly, the processor 41 may be programmed to actuate elements of a respective motion assembly 22 and a search process as well as to actuate a charging event. Further, the processor 41 may energize a "next" recharging assembly to move about the interior area in search of another battery in need of a charge—again by the processor 41 executing respective programming instructions.

Figure 5:
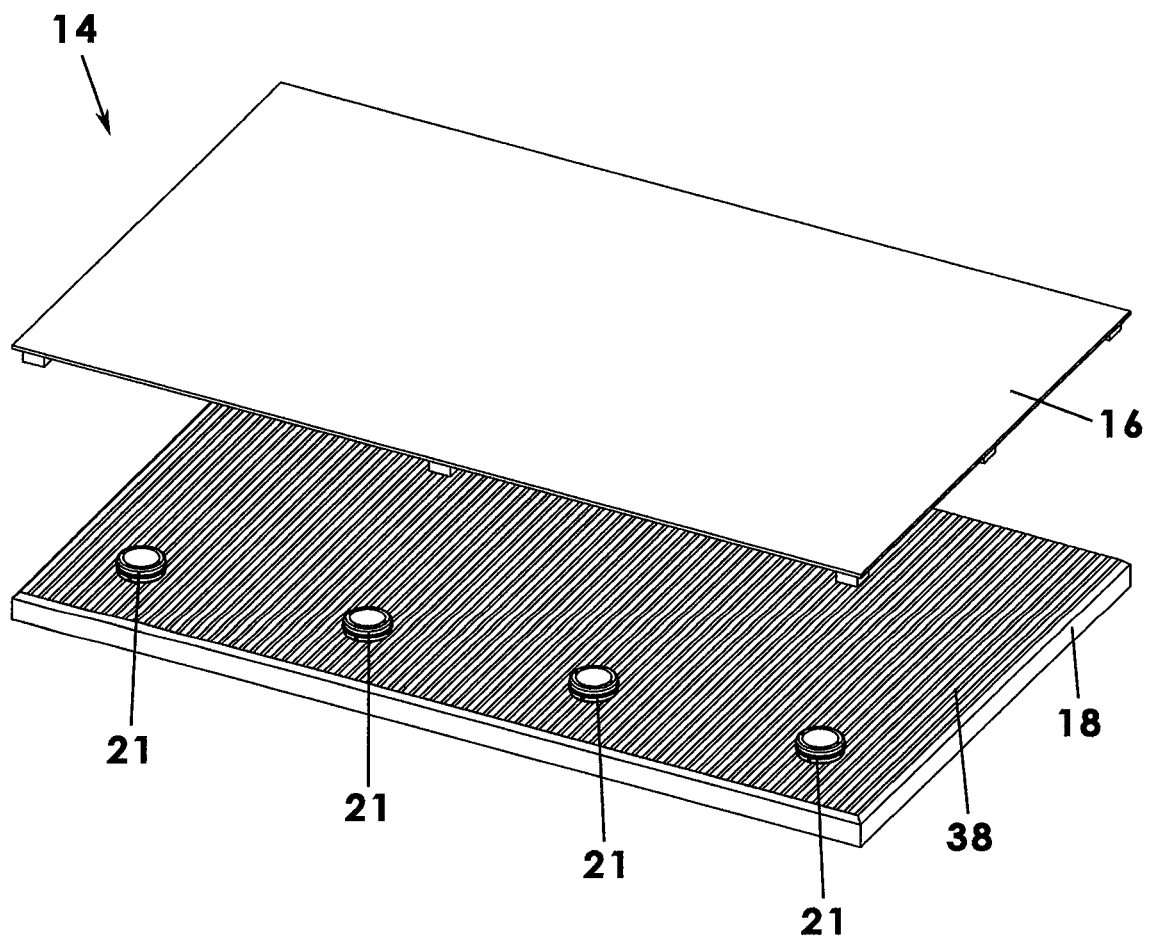
FIG. 5 is an exploded view of the system as in FIG. 1b illustrating the motion surface having a copper bottom wall.
Figure 6:
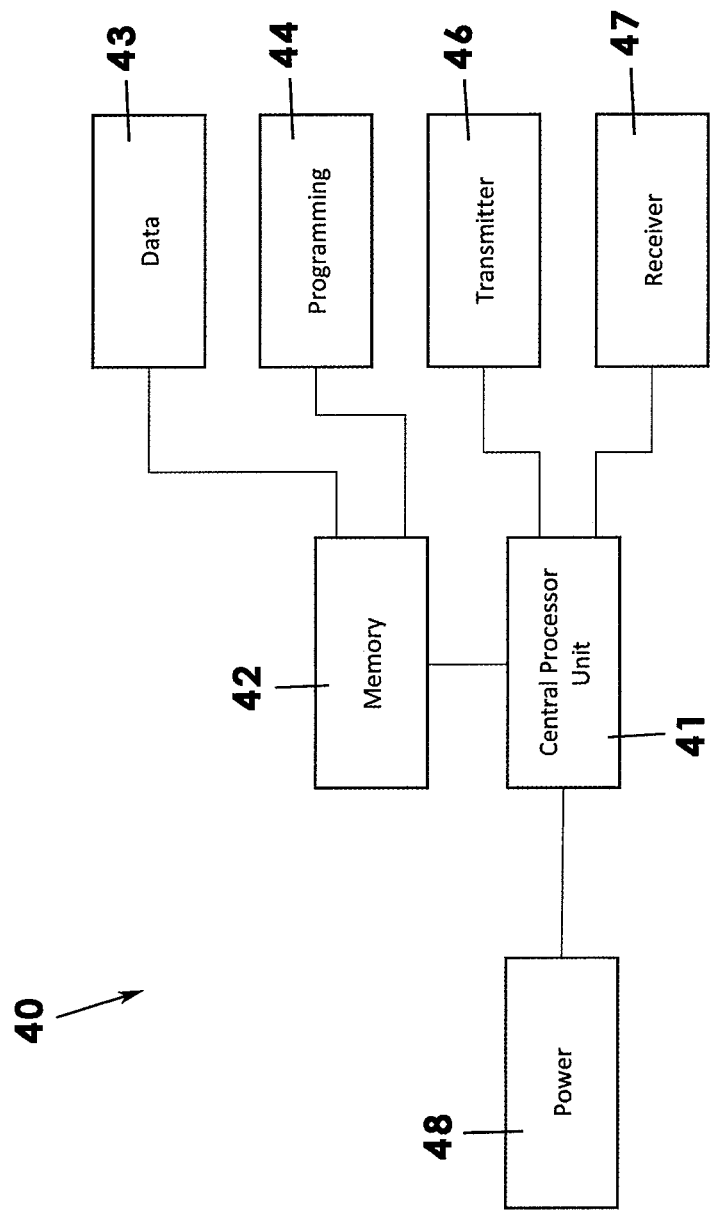
FIG. 6 is a block diagram illustrating the electronic components of a master control system according to the present invention.

It will be understood that each of the plurality of recharging assemblies 20 includes a power source for energizing its respective motor 23, energize its sensors, and to orient its wheels. This power source may be a rechargeable battery 36. In an embodiment, however, the power source may include copper coating or layer positioned atop the placement surface 16 that may be to an external electrical outlet and, as a result, to AC power (FIG. 5). In the case of the copper bottom wall 38, it is understood that each recharging assembly 21 will include complementary electrical components to receive electrical power and transform it, if necessary, into operational power, e.g. with a rectifier for conversion to DC power if compatible with the motor 23 of the motion assembly 22. The power source of a recharging assembly 21 may be to the respective controller 28 where it may be distributed to the other electronic components. The control system 40 also has a power source 48. Preferably, the control system 40 is connected to an AC power source, such as with a cord or cable plugged in to a wall outlet and that is electrically connected to the processor 41.

Figure 1B:
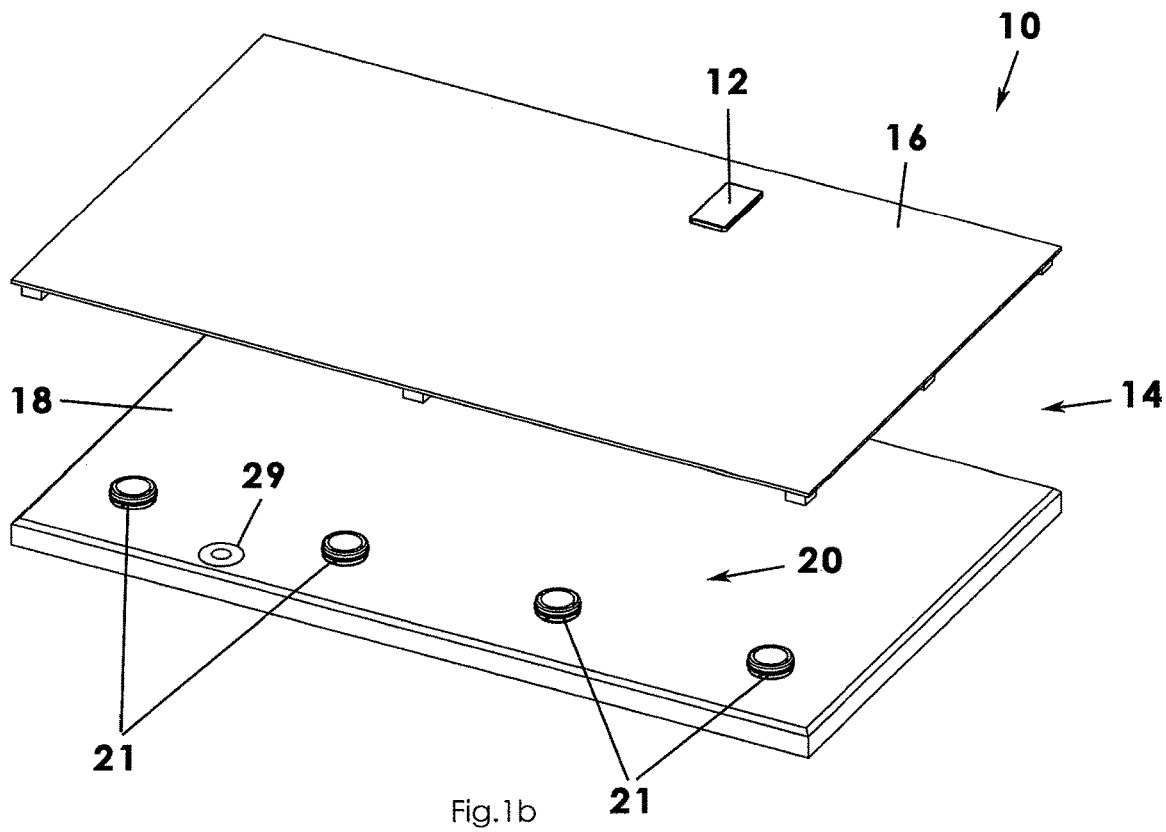
Figure 2A:
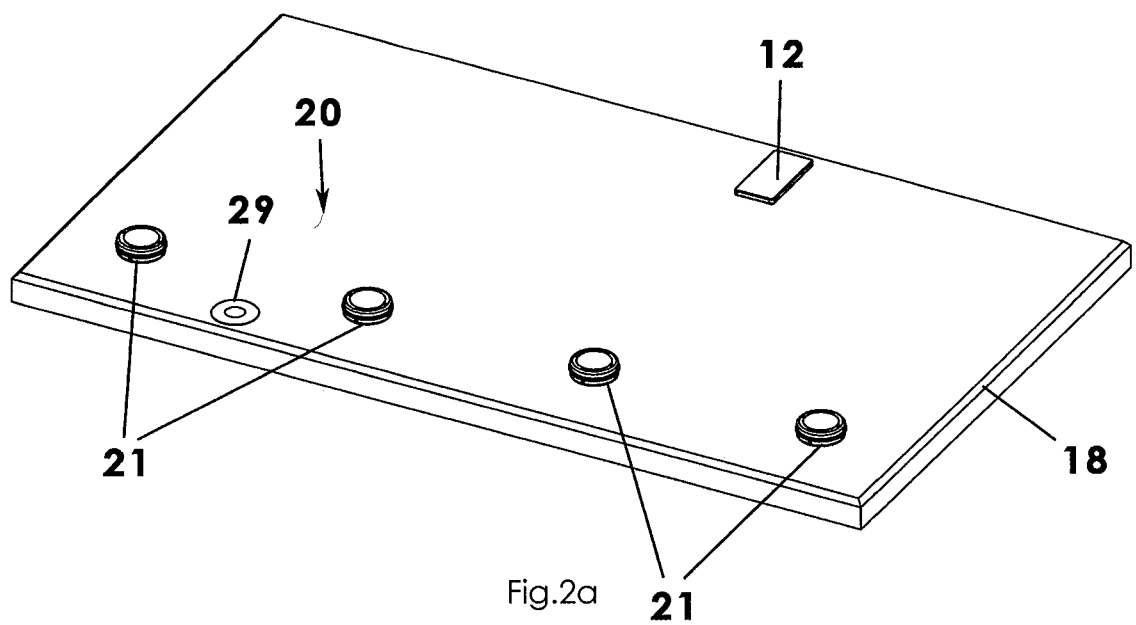
FIG. 2a is a perspective view of the system as in FIG. 1a illustrated with the placement surface removed for clarity.
Figure 2B:
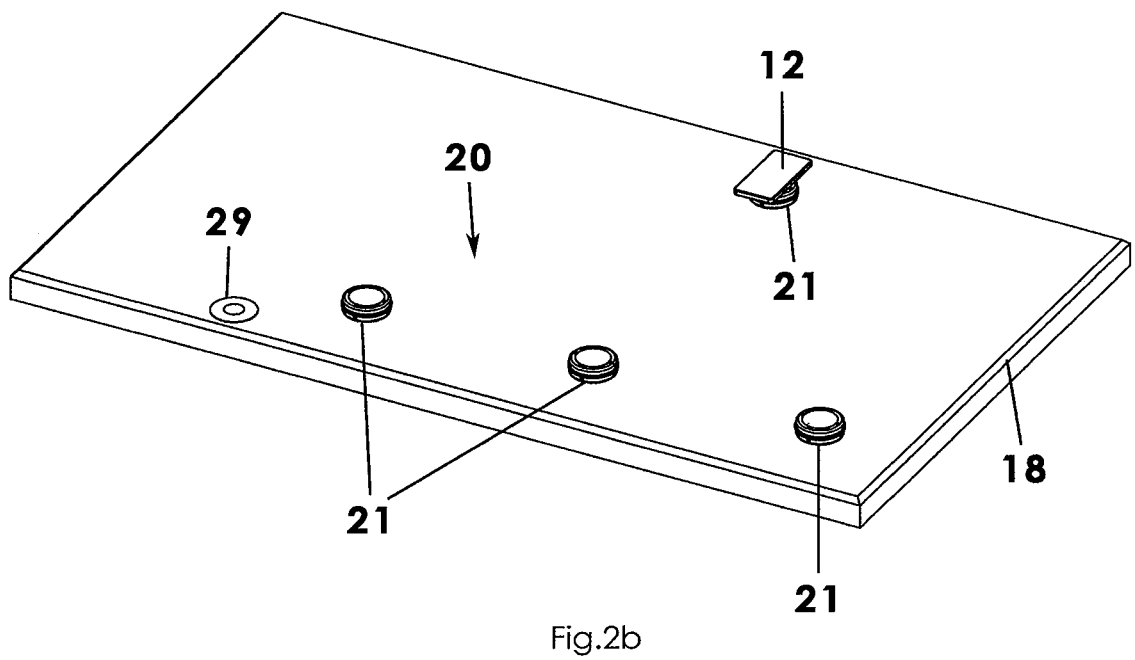
FIG. 2b is another perspective view of the system as in FIG. 1, illustrated with a first charging assembly having moved and located a battery in need of charging.
Figure 3A:
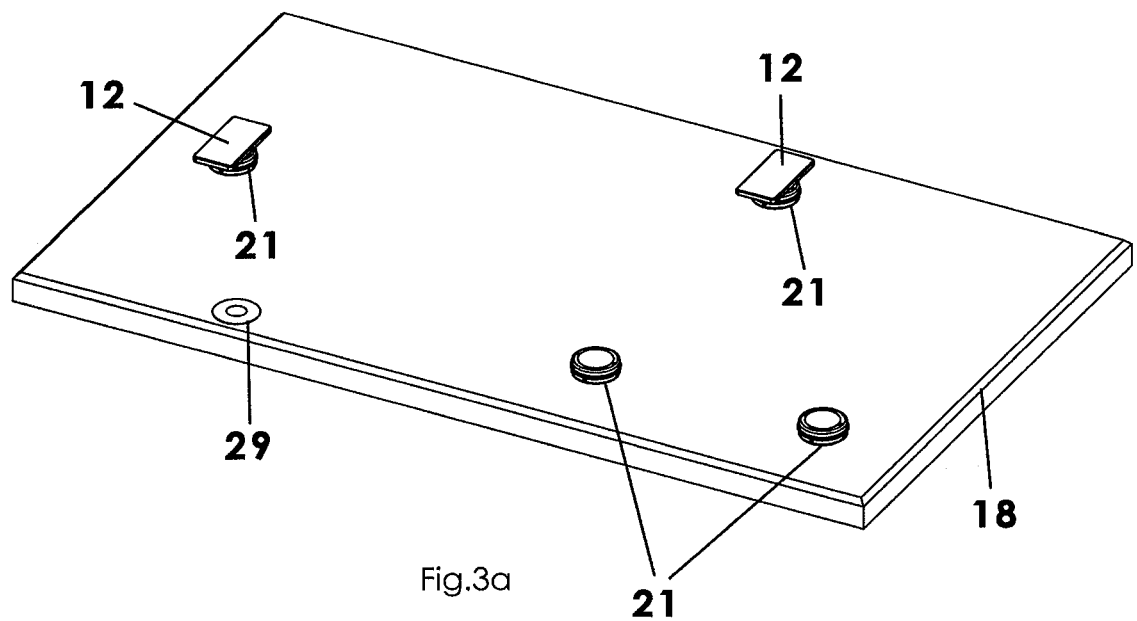
FIG. 3a is another perspective view of the system as in FIG. 1, illustrated with a first and a second charging assembly having moved and located a battery in need of charging.
Figure 3B:
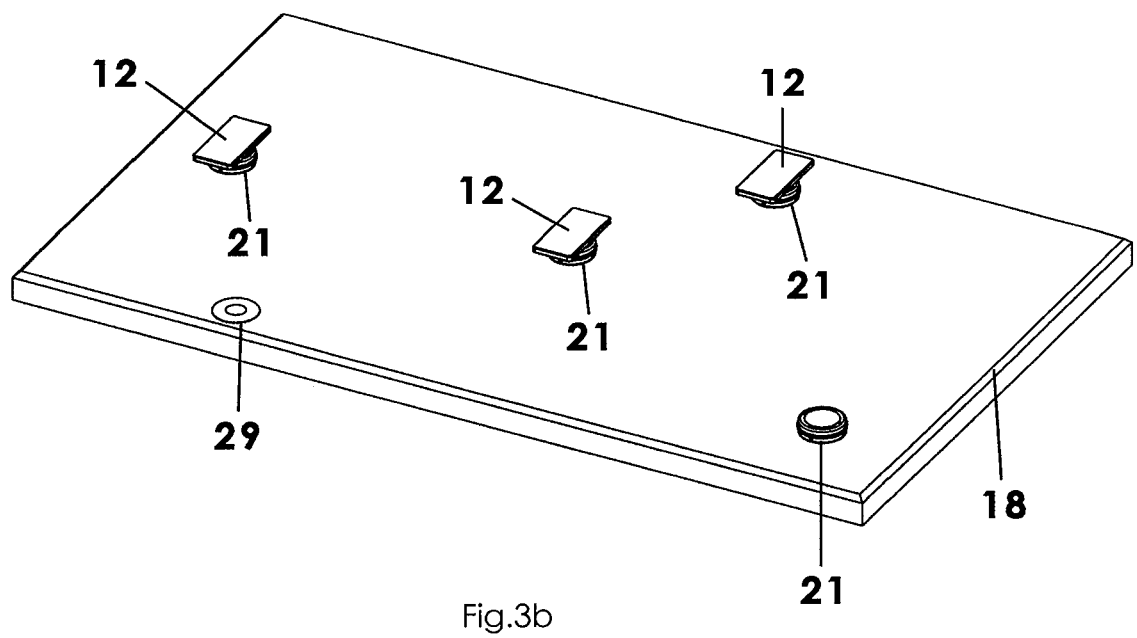
FIG. 3b is another perspective view of the system as in FIG. 1, illustrated with a first, second, and a third charging assembly having moved and located a battery in need of charging.
Figure 4A:
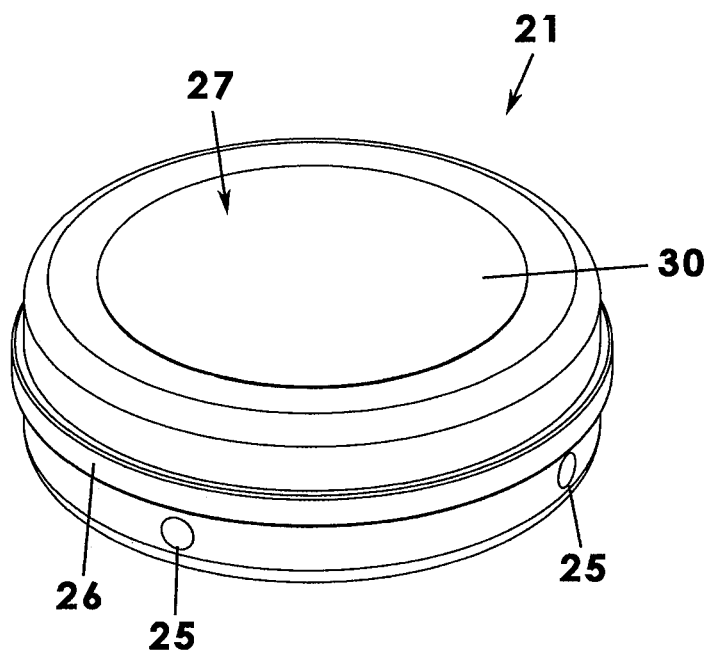
FIG. 4a is an elevated perspective view of a respective recharging assembly.
Figure 4B:
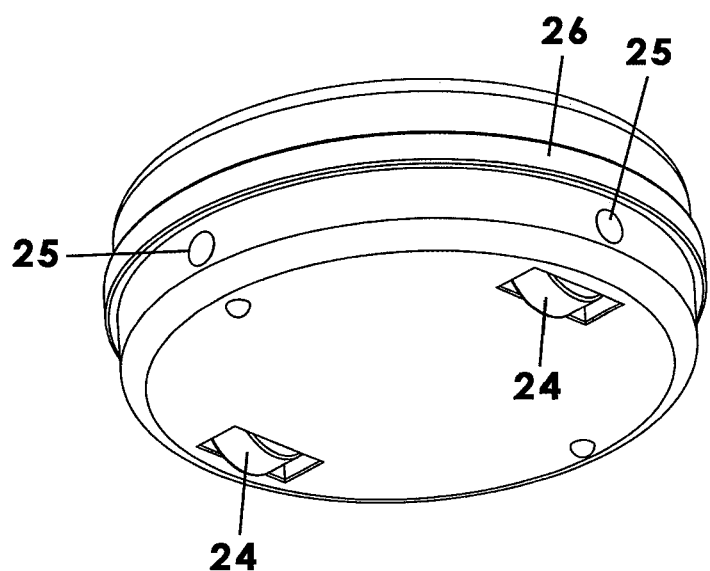

In regard to the drawings, FIGS. 1a and 1b illustrate the placement surface 16 and an electronic device 12 placed thereon. Then, in FIGS. 2a to 3b, the placement surface 16 is removed for clarity and the electronic device(s) merely appears to be hovering—again for clarity of the proximate position between a recharging assembly 21 and a battery associated with an electronic device 12 that is characteristic of inductive charging.

Now in an aspect that is critical to the effectiveness and purpose of the present invention, the control system 40 is configured, such as through circuitry or programming, and operable to actuate a "next" recharging assembly 21 to move about the interior area in search of another battery in need of a charge after a prior recharging assembly 21 has located a battery in need of recharging and has initiated a recharging event. Using the informal jargon introduced above, when a first robot (robot$_1$) locates a first battery in need of a charge and a recharging event is started, the control system 40 may actuate and energize a second robot (robot$_2$) to move about the interior area so as to locate a second battery in need of a charge. When a second battery is found and a second recharging event is started, the control system 40 may actuate and energize a third robot (robot$_3$) to move about the interior area so as to locate a third battery in need of a charge, and so on.

In another aspect, a charge pad 29 may be situated on the placement surface 16 and each recharging assembly 21 may be programmed to move atop said charge pad 29 so that a respective battery 29 may be recharged (FIG. 1).

Figure 7:
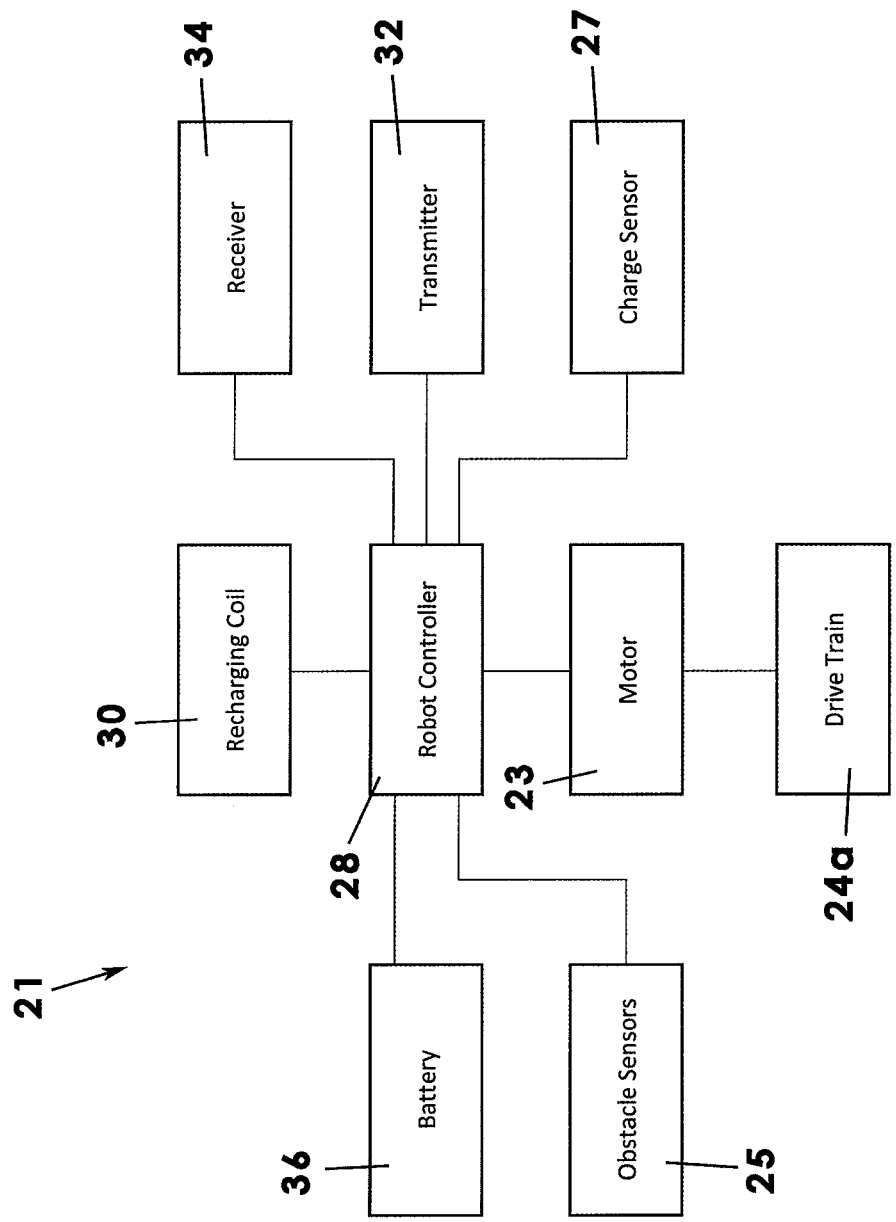
FIG. 7 block diagram illustrating the electronic components of a respective recharging assembly according to the present invention.
Figure 8:
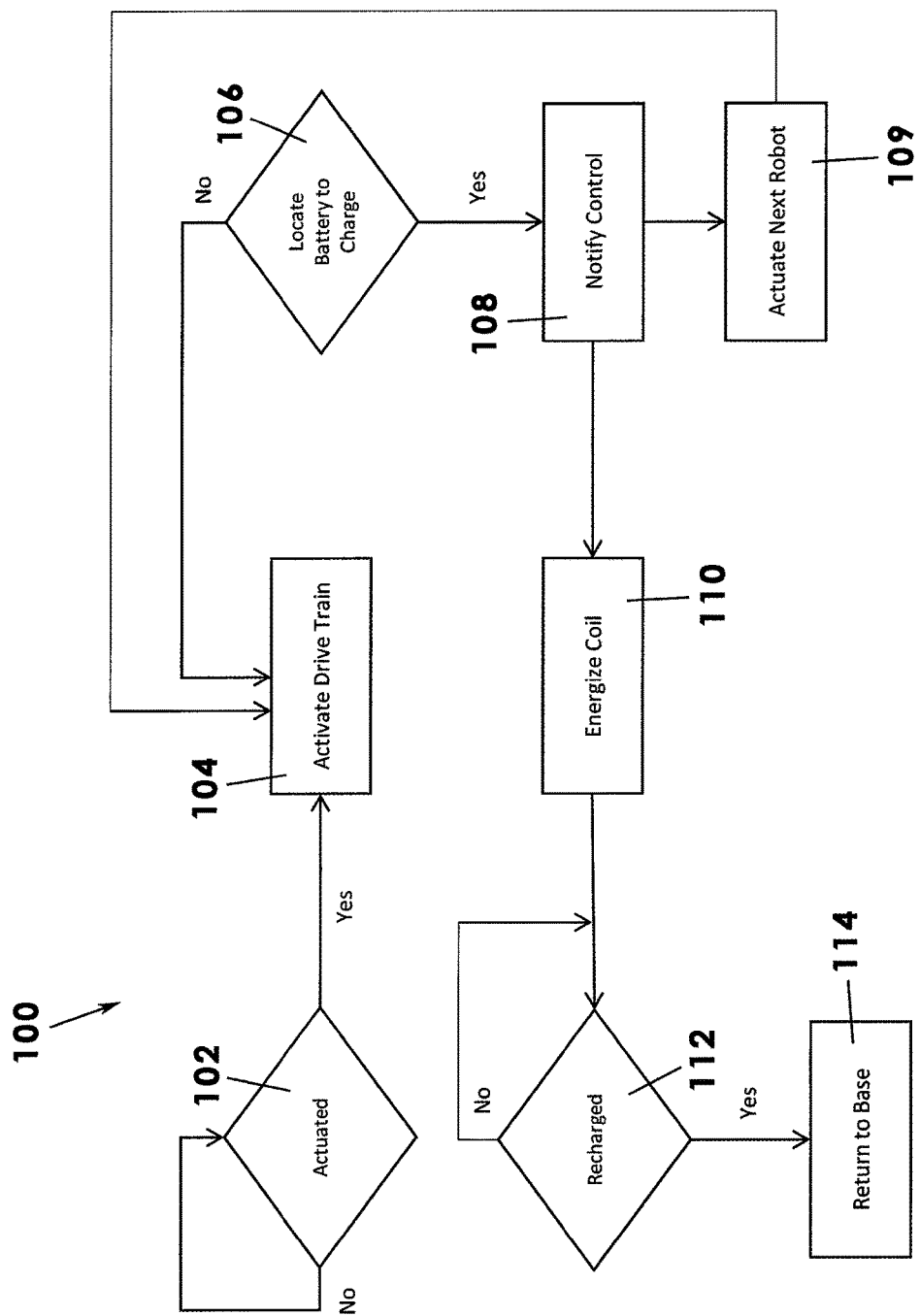
FIG. 8 is a flowchart illustrating a method for wireless and simultaneous recharging of a plurality of electronic computing devices placed upon a large area surface according to a preferred embodiment of the present invention.

A process 100 according to a method for wireless and simultaneous recharging of a plurality of electronic devices 12 placed upon a large area surface is shown in FIG. 7. At step 102, the processor 41 determines if the control system 40 is actuated to operate, i.e. is turned on. This may include a basic on/off switch or the control system 40 may always be considered to be on although it may be in a dormant mode (to conserve power consumption) until an electronic device 12 is deposited on the placement surface 16 or a manual button is pressed. If the control system 40 is determined to be actuated, the process 100 proceeds to step 104; otherwise it cycles again to step 102. At step 104, the processor 41 of the control system 40 may energize a first recharging assembly to move about the interior area is search of a battery in need of a charge as described above. In other words, the drive train (motor 23 and wheels 24 of robot$_1$) may be activated to move the housing associated therewith to move until an obstacle is encountered or according to a grid pattern, or the like. During this movement, the obstacle sensor 25 gathers obstacle data and is in data communication with the controller 28 associated with the respective recharging assembly 21 or, as the case may be, with the control system 40, All the while, the charging device 27 may be detecting for the presence of a battery in need of a charge.

Specifically, the process 100 continues to step 106 where the charging device 27 determined if a battery in need of a charge is detected, using the methods described above. If such a battery is detected, the process 100 proceeds to step 108 where the control system 40 is signaled, such as by the transmitter 32 associated with the respective recharging assembly 21 emitting an appropriate data signal to the control system 40. Otherwise, the process 100 returns to step 104 and the housing of the respective recharging assembly 21 continues to move and detect.

At step 108, the processor 41 initiates two actions as a result of a battery in need of a charge having been detected. One action is for the process 100 to advance to step 110 at which the processor 41 causes the current recharging assembly 21 (robot$_n$) to stop moving and to energize its onboard coil 30 to emit electromagnetic energy toward the located battery in need of a charge. The process 100 then passes control to step 112. Another action of the control system 40 at step 108 is to advance to step 109 at which the processor 41 may initiate activation of a next recharging assembly 21 (i.e. robot$_{n+1}$), such as by emission of an appropriate signal via transmitter 32, to move forward in active search of another battery in need of a charge, in the manner described above. The process 100, then, essentially starts over or returns to step 104.

Returning to step 112, the processor 41 determines if the battery being recharged by the coil 30 associated with robot$_n$ is fully recharged, it being understood that this determination may include electrical communications between the controller 28, coil 30, and the battery being recharged followed by a signal transmitted to the control system 40 (and received by receiver 47). If the control system 40 determines the battery has been fully recharged, then the process 100 moves to step 114 at which the processor 41, under program control, causes the respective recharging assembly 21 to return to its base (i.e. its original position) where it may again be available to be sent on a so-called reconnaissance recharging mission. In an embodiment, the determination of a battery being fully recharged may be made by an onboard controller 28 although this may increase the complexity of the controller 28 or its memory requirements.

It is understood that while certain forms of this invention have been illustrated and described, it is not limited thereto except insofar as such limitations are included in the following claims and allowable functional equivalents thereof.

The invention claimed is:

1. A recharging system for wireless and simultaneous recharging of a plurality of electronic computing devices placed upon a large area surface, said recharging system comprising:
   a placement assembly having a placement surface upon which the plurality of electronic devices are placed and defining an interior area beneath said placement surface;
   a plurality of mobile recharging assemblies disposed in said interior area, a respective mobile recharging assembly including a housing having a motion assembly operable to move said housing in said interior area when energized;
   an obstacle sensor disposed on said housing and operable to generate obstacle data upon detection of an obstacle;
   a controller in data communication with said obstacle sensor and with said motion assembly of said respective mobile recharging assembly, said controller being operable to send an alternative motion signal to said motion assembly according to said obstacle data;
   a charging device disposed on said housing of said respective mobile recharging assembly and in data communication with said controller, said charging device being configured to detect a battery on said placement surface and to detect an electrical load on said detected battery and to generate charge data indicative of said battery detection and said electrical load;
   a control system positioned proximate said interior area in data communication with said controller of each of said plurality of mobile charging assemblies, said control system being operable to energize said charging device associated with said respective mobile recharging assembly to charge the detected battery;
   wherein said control system is operable to energize a next mobile charging assembly of said plurality of mobile charging assemblies if said charging device includes said charge data indicative of having located a respective electronic computing device in need of charging.

2. The recharging system as in claim 1, wherein said charging device includes an sensing member configured to receive a load signal from said respective electronic computing device indicative of said battery in need of charging.

3. The recharging system as in claim 1, wherein said charging device includes a signal strength sensing device operable to detect signal strength data of said respective computing device indicative of said battery in need of charging.

4. The recharging system as in claim 1, wherein said charging device locates and recharges a respective battery of an electronic computing device among the plurality of electronic computing devices using a Qi standard of recharging wireless device by inductive wireless charging.

5. The recharging system as in claim 1, wherein said respective mobile recharging assembly includes a battery power source in electrical communication with said controller.

6. The recharging system as in claim 1, wherein said control system is electrically connected to an electrical power source.

7. The recharging system as in claim 1, wherein said control system includes:
   a processor; and
   a memory that is non-volatile and is in data communication with said processor, said memory configured to store data and programming;
   wherein said programming, when executed by said processor, causes said processor to energize said next mobile charging assembly of said plurality of charging assemblies if said charging device includes said charge data indicative of having located said respective electronic computing device in need of charging.

8. The recharging system as in claim 1, wherein:
   said obstacle sensor includes a pressure sensor disposed on said housing; and
   said controller is operable to transmit an escape movement to said motion assembly suitable to continue movement around the obstacle.

9. The recharging system as in claim 1, wherein said motion assembly includes:
   a motor in data communication with said controller of said respective mobile recharging assembly;
   at least one pair of wheels in data communication with said controller of said respective mobile recharging assembly, operably coupled to said motor, and positioned on a bottom side of said housing; and
   wherein said controller is operable to energize said motor and said at least one pair of wheels independently and in a forward or rearward direction.

10. The recharging system as in claim 1, wherein said charging device includes a coil coupled to a battery power source and operable to recharge said battery in need of charging using inductive wireless charging according to a Qi protocol.

11. A recharging method for wireless and simultaneous recharging of a plurality of electronic computing devices placed upon a large area surface, said recharging method comprising:
   positioning a placement assembly that includes a placement surface upon which the plurality of electronic devices are placed and that has an interior area beneath said placement surface;
   positioning a plurality of mobile recharging assemblies in said interior area, a respective mobile recharging assembly including a housing having a motion assembly for moving said housing in said interior area when energized;
   detecting an obstacle using an obstacle sensor disposed on said housing and generating obstacle data upon detection of said obstacle;
   causing said respective recharging assembly to move in an alternative direction according to said obstacle data;
   mounting a charging device on said housing of said respective mobile recharging assembly for charging a respective electronic computing device when energized;
   said charging device detecting a battery of a respective electronic computing device on said placement surface that is in need of charging and generating charge data upon said detecting;
   actuating said charging device to recharge the battery associated with said respective electronic computing device according to said charge data;
   a control system energizing a next mobile charging assembly of said plurality of mobile charging assemblies if said charging device includes said charge data indicative of having located said respective electronic computing device in need of a charge.

12. The recharging method as in claim 11, wherein detecting said battery of said respective electronic computing device on said placement surface in need of charging includes receiving a load signal from said respective electronic computing device indicative of said battery in need of charging.

13. The recharging method as in claim 11, wherein said detecting said battery of said respective electronic computing device on said placement surface in need of charging includes detecting signal strength data of said respective computing device indicative of said battery in need of charging.

14. The recharging method as in claim 11, wherein said plurality of mobile recharging assemblies are disposed in said interior area beneath said placement surface initially in a laterally adjacent configuration, each mobile recharging assembly being configured to move independently of and sequentially to any other said mobile recharging assembly.

15. The recharging method as in claim 11, wherein:
only one mobile recharging assembly is movable at any point in time; and
said plurality of mobile recharging assemblies are selectively energized to recharge a respective battery in need of charging.

16. The recharging method as in claim 11, wherein said motion assembly includes:
a motor in data communication with said controller of said respective mobile recharging assembly;
at least one pair of wheels positioned on a bottom side of said housing and in data communication with said controller of said respective mobile recharging assembly and electrically connected to said motor; and
wherein said controller is operable to energize said at least one pair of wheels independently to move in a forward or rearward direction.

17. The recharging method as in claim 11, wherein:
said obstacle sensor includes a pressure sensor disposed on said housing; and
said controller is operable to transmit an escape movement to said motion assembly suitable to continue movement around the obstacle.

18. The recharging method as in claim 11, wherein said charging device is a coil coupled to a battery power source and operable to recharge said battery in need of charging by inductive wireless charging.

19. The recharging method as in claim 11, wherein said placement surface is a tabletop or a countertop.

20. The recharging method as in claim 11 wherein said charging device locates and recharges a respective battery using a Qi standard of recharging wireless device by inductive wireless charging.

* * * * *